(12) United States Patent
Pudney et al.

(10) Patent No.: US 9,992,670 B2
(45) Date of Patent: Jun. 5, 2018

(54) MACHINE-TO-MACHINE CELLULAR COMMUNICATION SECURITY

(71) Applicant: VODAFONE IP LICENSING LIMITED, Newbury, Berkshire (GB)

(72) Inventors: Christopher Pudney, London (GB); Assen Mahaboob Khan Golaup, London (GB); Nicholas Bone, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 75 days.

(21) Appl. No.: 14/803,586

(22) Filed: Jul. 20, 2015

(65) Prior Publication Data

US 2016/0050562 A1    Feb. 18, 2016

(30) Foreign Application Priority Data

Aug. 12, 2014  (GB) .................................. 1414298.8
Aug. 20, 2014  (GB) .................................. 1414841.5

(51) Int. Cl.
*H04W 12/04* (2009.01)
*H04W 12/02* (2009.01)
(Continued)

(52) U.S. Cl.
CPC ......... *H04W 12/04* (2013.01); *H04L 63/0428* (2013.01); *H04W 12/02* (2013.01);
(Continued)

(58) Field of Classification Search
CPC . H04W 12/04; H04L 63/0428; H04L 63/0435
See application file for complete search history.

(56) References Cited

U.S. PATENT DOCUMENTS 6,775,804 B1    8/2004  Dawson
6,845,160 B1 *  1/2005  Aoki ................... H04L 63/0428
                                                        380/279
(Continued)

FOREIGN PATENT DOCUMENTS

CN   103152731    6/2013
EP     2173055    4/2010
(Continued)

OTHER PUBLICATIONS

European Search Report for EP 15 17 7768 dated Jan. 13, 2016.
(Continued)

*Primary Examiner* — Carl G Colin
*Assistant Examiner* — Vance M Little
(74) *Attorney, Agent, or Firm* — Workman Nydegger (57) ABSTRACT

Facilitating authentication on communication between a mobile terminal and a server is achieved. The communication is made through a Serving GPRS Support Node (SGSN) of a network in which the mobile terminal is operating. A Home Public Land Mobile Network (PLMN) of the mobile terminal generates a ciphering key for encryption of packet-switched data between the mobile terminal and the server. As part of a message from a network entity in the Home PLMN to the SGSN in which the SGSN expects to receive the ciphering key, alternative data is communicated in place of the ciphering key. Secure communication between the mobile terminal and the server is performed by applying encryption using a ciphering key generated by a network entity in a Home PLMN of the mobile terminal in messages between the mobile terminal and the server.

20 Claims, 2 Drawing Sheets

(51) Int. Cl.
  *H04L 29/06* (2006.01)
  *H04W 4/00* (2018.01)
  *H04W 12/06* (2009.01)

(52) U.S. Cl.
  CPC ......... *H04L 63/0435* (2013.01); *H04W 4/005* (2013.01); *H04W 12/06* (2013.01)

(56) References Cited

U.S. PATENT DOCUMENTS

| | | | |
|---|---|---|---|
| 7,106,742 | B1 | 9/2006 | Frisch |
| 2002/0066011 | A1 | 5/2002 | Vialen et al. |
| 2003/0039234 | A1 | 2/2003 | Sharma et al. |
| 2003/0119481 | A1 | 6/2003 | Haverinen et al. |
| 2004/0073785 | A1 | 4/2004 | Hurrta et al. |
| 2006/0262778 | A1 | 11/2006 | Haumont et al. |
| 2008/0076392 | A1 | 3/2008 | Khetawat et al. |
| 2010/0049980 | A1 | 2/2010 | Barriga et al. |
| 2010/0293595 | A1* | 11/2010 | Naslund ............. H04L 41/0893 726/1 |
| 2011/0123029 | A1 | 5/2011 | Zhang |
| 2011/0307694 | A1 | 12/2011 | Broutis et al. |
| 2012/0309355 | A1 | 12/2012 | Pudney et al. |
| 2014/0075509 | A1 | 3/2014 | Holtmanns et al. |
| 2014/0075532 | A1* | 3/2014 | Murakami ............. H04W 12/06 726/9 |
| 2014/0080446 | A1 | 3/2014 | Miklos et al. |
| 2016/0050561 | A1 | 2/2016 | Pudney et al. |
| 2016/0050568 | A1 | 2/2016 | Pudney et al. |

FOREIGN PATENT DOCUMENTS

| | | | | |
|---|---|---|---|---|
| EP | | 2296389 | A1 | 3/2011 |
| EP | | 2432264 | A1 | 3/2012 |
| EP | | 2 584 802 | A2 | 4/2013 |
| EP | | 2603024 | | 6/2013 |
| EP | | 2 721 854 | A1 | 4/2014 |
| EP | | 2757819 | A1 | 7/2014 |
| WO | WO 01/63954 | A1 | | 8/2001 |
| WO | WO2004/073347 | A1 | | 8/2004 |
| WO | | 2008048179 | | 4/2008 |
| WO | | 2011163561 | | 12/2011 |
| WO | WO 2014013085 | A2 * | 1/2014 | ............. H04W 8/20 |

OTHER PUBLICATIONS

IPO Search Report for GB1513281.4 dated Feb. 24, 2016.
3GPP: "3rd Generation Partnership Project; Technical Specification Group Services and System Aspects; 3G Security; Security Architecture (3G TS 33.102 version 3.3.1 Release 1999)", 3GPP Draft; 33102-331, 3rd Generation Partnership Project (3GPP), Mobile Competence Centre; 650 Route des; France, vol. SA WG5, No. Sweden; Jul. 31, 2001, Jul. 31, 2001 (Jul. 31, 2001), XP050290828 * p. 19 p. 24 *.
U.S. Appl. No. 14/803,595, filed Jul. 20, 2015, Christopher Pudney et al.
U.S. Appl. No. 14/803,581, filed Jul. 20, 2015, Christopher Pudney et al.
IPO Search Report for GB1414300.2 dated Dec. 9, 2014.
European Search Report for EP 15 17 7750 dated Jan. 14, 2016.
IPO Search Report for GB1414301.0 dated Dec. 8, 2014.
European Search Report for EP 15 17 7769 dated Jan. 14, 2016.
3rd Generation Partnership Project; Technical Specification Group Services and System Aspects; Study on security aspects of Machine-Type Communications (MTC) and other mobile data applications communications enhancements (Release 12), 3GPP Draft; 33868-C10, 3rd Generation Partnership Project (3GPP), Mobile Competence Centre ; 650, Route des Lucioles ; F-06921 Sophia-Antipolis Cedex; France Jun. 19, 2014 (Jun. 19, 2014), XP050838130, Retrieved from the Internet: RL:http://www.3gpp.org/ftp/tsg_sa/WG3_Secrity/TSGS3_75_Sapporo/SA#64/specs/ [retrieved on Jun. 19, 2014] * p. 29, line 1-p. 36, line 39.
"3rd Generation Partnership Project; Technical Specification Group Services and System Aspects; Study on security aspects of Machine-Type Communications (MTC) and other mobile data applications communications enhancements (Release 12)", 36PP Draft; 33868-C10, 3rd Generation Partnership Project (3GPP), Mobile Competence Centre ; 650, Route des Lucioles ; F-06921 S0phia-Antip0lis Cedex ; France Jun. 26, 2014 (Jun. 26, 2014), XP050907386, Retrieved from the Internet: URL:http://www.3gpp.org/ftp/Specs/2014-12/Rel-12/33_series/ [retrieved on Jun. 26, 2014] * the whole document *.
"Digital cellular telecommunications system (Phase 2+); Universal Mobile Telecommunications System (UMTS); LTE; Generic Authentication Architecture (GAA); Generic Bootstrapping Architecture (GBA) Push function (3GPP TS 33.223 version 11.0.0 Release 11)", Technical Specification, Eur0pean Telecommunications Standards Institute (ETSI), 650, R0ute des Luci0les ; F-06921 Sophia-Antipolis ; France, vol. 3GPP SA 3, No. VII.0.0, Oct. 1, 2012 (Oct. 1, 2012), XP014075730, * the whole document.
Office Action issued in U.S. Appl. No. 14/803,595 dated Dec. 1, 2016.
Further Search Report for GB1414298.8 dated Jan. 21, 2015.
Search Report for GB1414298.8 dated Dec. 3, 2014.
Office Action issued in U.S. Appl. No. 14/803,581 dated Aug. 25, 2017.
Office Action issued in U.S. Appl. No. 14/803,583 dated Oct. 6, 2017.
Ertekin et al. "Integration of Robust Header Compression Over Ipsec Security Associations" Internet Engineering Task Force, May 2010, 15 pages.

* cited by examiner

MACHINE-TO-MACHINE CELLULAR COMMUNICATION SECURITY

CROSS REFERENCE TO RELATED APPLICATIONS

This application claims priority to United Kingdom Application Number 1414841.5, filed on Aug. 20, 2014, and United Kingdom Application Number 1414298.8, filed on Aug. 12, 2014, the entirety of which are incorporated herein by reference.

TECHNICAL FIELD OF THE INVENTION

The invention concerns a method for communication between a mobile terminal operating in a cellular network and a server, a mobile terminal and a Serving GPRS Support Node (SGSN) of a cellular network.

BACKGROUND TO THE INVENTION

Cellular networks have conventionally been designed to include some security functionality. In the GSM EDGE Radio Access Network (GERAN) architecture, specified by the Third Generation Partnership Project (3GPP), packet-switched traffic to and from a User Equipment (UE), also termed Mobile Station (MS), using General Packet Radio Service (GPRS) is routed through a Serving GPRS Support Node (SGSN) in the Public Land Mobile Network (PLMN) in which the UE is operating. Encryption of user-plane data with Cyclic Redundancy Check (CRC) for error detection is supported between the UE and SGSN.

Increasingly, cellular networks are being adapted to facilitate their use by Machine-to-Machine (M2M) type devices. These are often configured to communicate with a server that is in (for instance, a part of) or in communication with the Home PLMN of the device (the device typically comprising a UE configured with a subscription to the Home PLMN). The server may be in communication with the Gateway GPRS support node (GGSN) in the Home PLMN. In some circumstances, the M2M device will be roaming, so the SGSN will be in the Visited PLMN, whilst the GGSN is in the Home PLMN. GPRS tunnelling protocol (GTP) allows communication between the SGSN and GGSN and since the communication typically occurs within an operator administered environment (over intra-PLMN or inter-PLMN), the security of the interfaces has been considered to be sufficient.

However, from an application level perspective, the customer may not be satisfied with the level of security within the mobile network, especially the absence of ciphering or integrity protection between SGSN and GGSN. This may be especially problematic when the UE is operating outside its Home PLMN. Even if the link between a visited SGSN and GGSN can be secured, there is still the risk that communication between the MS and Application server may be intercepted in a visited network (e.g. in visited SGSN), with which the customer may not have a contractual relationship.

In the third GERAN teleconference on Cellular Internet of Things (IoT), the need for secure transfer of both signalling and user data for Cellular IoT applications was highlighted. For an approach using the Gb interface (between the Base Station Subsystem and SGSN), it was identified that integrity protection is not supported between the MS and the SGSN and user plane security between MS and SGSN might benefit from more secure encryption algorithms, such as GEA4. However, for both the Gb interface architecture approach and an option based on the S1 interface (between an eNodeB and core network), user plane encryption does not extend to the GGSN/Packet Data Network (PDN) gateway (or a nearby MTC server).

Customers may therefore decide to run their own application layer security mechanisms end-to-end, between their application server and the UE. End-to-end security protocols, such as Datagram Transport Layer Security (DTLS), between the MS and an application server provide one way of securing the communication between MS and a cellular IoT application server, irrespective of the nature of the security over the radio access and within the cellular network domain (including both the home network and visited network).

One of the main drawbacks of supporting existing end-to-end security protocols for Cellular IoT devices is the amount of security related signalling (for example, protocol overheads such as DTLS handshakes) that need to be exchanged between MS and the application server before any useful information can be sent (usually a small data packet). The signalling overhead will not only reduce the radio access capacity but, more importantly, increase the energy consumption by the M2M device. This may make it difficult to achieve the objective of having devices lasting for years with standard battery power.

As a result, this approach will add a significant level of signalling overhead before any useful application data can be transmitted, unless the process can be optimised. For M2M type applications, it is likely that only small packets of data will need to be sent at relatively long time intervals (for example, hours or even days). Moreover, it is expected that M2M data will be transmitted over narrowband cellular systems using small chunks of spectrum, with very low throughput capabilities. Introducing end-to-end application layer security for M2M applications, without any optimisation in the signalling exchanges, will add a significant overhead to the amount of signalling bits that should need to be transmitted in order to convey an information bit. This may not only affect the capacity of the system but, more importantly, may affect the battery life of M2M devices which are expected to operate for years on battery power.

It is thus desirable that security in cellular networks is either improved in an efficient way to remove the need for end-to-end security between the application server and the UE or an optimised end-to-end security mechanism is developed that reduces the signalling overhead to establish security between UE and an application server. Enhancements to the cellular network security framework to achieve those aims are valuable.

SUMMARY OF THE INVENTION

There is provided a method for facilitating authentication on communication between a mobile terminal and a server according to claim 1, a method of secure communication via a cellular network between a mobile terminal and a server in line with claim 5, a mobile terminal for operation in a cellular network in line with claim 18 and a network entity of a cellular network in accordance with claim 19. Other preferred features are disclosed with reference to the claims and in the description below.

The HPLMN (which could include the HLR/HSS, AuC or a proxy) generates or stores a Ciphering Key (CK) for a UE and when the HPLMN provides the SGSN with an authentication vector and/or information about the CK (which could be the CK itself), this information does not allow derivation of the actual CK (for example by providing a dummy CK, random data or an encrypted version of the CK where the SGSN cannot decode it). This includes roaming and non-roaming cases (that is, where the Visited PLMN and Home PLMN are the same network or different networks). Existing systems consider it essential that the SGSN be provided with the CK (or the Kc for 2G Authentication and Key Agreement).

The CK may instead be used for encrypted communication between the UE and a server that is not the SGSN. This encryption may be on the control plane and/or on the user plane (for instance, at the network layer). The end-point for encryption on packet-switched services via the SGSN may thereby be changed to the server.

BRIEF DESCRIPTION OF THE DRAWING

The invention may be put into practice in a number of ways, and preferred embodiments will now be described by way of example only and with reference to the accompanying drawing, in which.

DETAILED DESCRIPTION OF PREFERRED EMBODIMENTS

Figure 1:
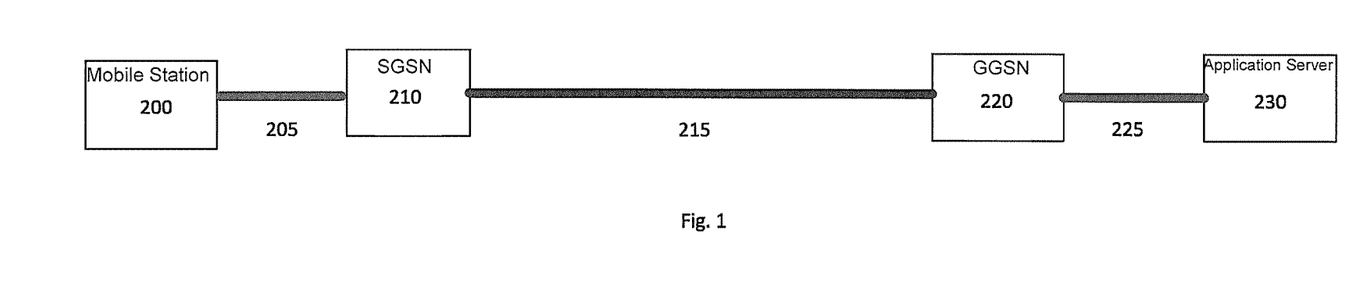
FIG. 1 depicts a schematic illustration of cellular network entities, explaining a potential user plane security gap between the SGSN and GGSN.

Referring first to FIG. 1, there is depicted a schematic illustration of cellular network entities, explaining a potential user plane security gap between the SGSN and GGSN. As discussed above, there is a secure link 205 between the Mobile Station (MS) 200 and the SGSN 210. This is true even if the SGSN 210 is in a visited PLMN. There is also secure link 225 between the GGSN 220 and an Application Server (AS) 230 (which may be specific to IoT applications). Both the GGSN 220 and the AS 230 may be in the Home PLMN, for example.

However, the link 215 between the SGSN 210 and the GGSN 220 may not be secure. This is especially true when the SGSN 210 is a visited SGSN, as the SGSN 210 and GGSN 220 are part of different networks (that is, the MS 200 is roaming). This disclosure is intended to address issues resulting from this potentially insecure link 215. In particular, this may address issues with using existing end-to-end application level security protocols for Cellular IoT. For example, it may be possible to identify potential solutions to establish integrity protection between MS 200 and SGSN 210 and user plane encryption between MS 200 and the GGSN 220 and/or AS 230, without the overhead incurred by end-to-end application level protocols.

Figure 2:
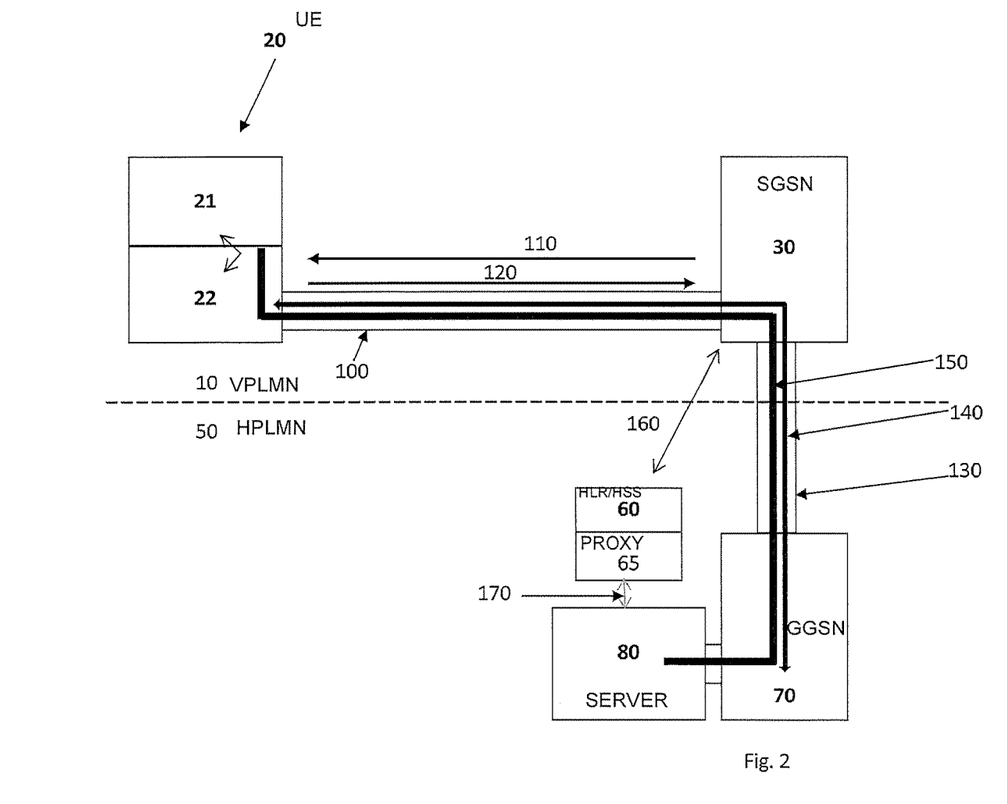
FIG. 2 shows a schematic diagram of a cellular network architecture illustrating aspects of the invention.

Referring now to FIG. 2, there is shown a schematic diagram of a cellular network architecture. This comprises: a Visited PLMN (VPLMN) 10; and a Home PLMN (HPLMN) 50. This distinction is only shown for the purposes of abstraction and it will be understood that, in some cases, the HPLMN 50 and the VPLMN 10 may be the same network and/or have the same operator.

In the VPLMN 10 is shown: a UE 20; and an SGSN 30. In the HPLMN 50 is shown: a Home Location Register/Home Subscriber Server (HLR/HSS) 60; a GGSN 70; and a server 80. The GGSN 70 can additionally or alternatively be a Packet Data Network Gateway (PDN-GW, not shown). The UE 20 intends unidirectional or bi-directional communication with the server 80. The server 80 may form part or be in communication with the GGSN 70. Although the server 80 is shown as sitting in the HPLMN 50, this is simply schematic and may or may not be the case. Secure communications infrastructure may be provided between one or more network entities in the HPLMN 50 (such as the GGSN 70) and the server 80. The SGSN 30 may be replaced by an network entity having corresponding or similar functionality, but for simplicity such a network entity may be considered to be an SGSN or an equivalent.

Both the VPLMN 10 and the HPLMN 50 will comprise further network entities and interfaces in practice, but the simplified diagram of FIG. 1 is shown to facilitate easier understanding of the interfaces and messages presented below. A number of specific aspects will now be discussed with reference to FIG. 1, in particular to show specific interfaces and messages.

Cryptographic Integrity Protection Between UE and SGSN

The interface 100 between the UE 20 and the SGSN 30 (the LLC layer in GPRS) conventionally supports encryption and a 24-bit Cyclic Redundancy Check (CRC). This is intended to protect the visibility of the data from third parties and to detect random bit errors or other corruption, for example due to interference. The CRC bits are communicated via the Logical Link Control (LLC) layer on the interface 100, which either passes the frame through with a warning if errors are tolerable or discards the frame if accuracy is critical. Error correction is not possible and deliberate manipulation of the bit-stream may not be detectable. Indeed, the SGSN 30 (at the LLC layer) does not perform error correction. The LLC layer either passes the frame through with a warning if errors are tolerable, or discards the frame if accuracy is critical. A CRC can detect random bit errors, but cannot cope with deliberate manipulation of the bit-stream. Indeed, existing GPRS encryption also does not prevent deliberate manipulation. It simply makes it difficult for an attacker to see what they are manipulating.

Encryption and error detection may therefore be of limited benefit, especially for applications such as M2M devices. However, there may be some benefit in using a cryptographic integrity check such as the 32 bit Message Authentication Code (MAC) provided by EIA1 (formerly UIA2). An approach for integrity protection between the MS and SGSN may be possible by reusing the security algorithm negotiation algorithm from UMTS and/or LTE and introducing a MAC. This was discussed in a paper presented at cellular IoT telco #3, entitled "Minimal security enhancements for GSM/GPRS to support secure delivery of MTC data". This approach may help to prevent data sessions from being hijacked. However, it increases the overhead on the user plane and also adds extra signalling overhead for the security algorithm negotiation.

In contrast, the CRC may be replaced with a cryptographic integrity check. In other words, the CRC field at the LLC layer may be substituted with a MAC to provide integrity protection between UE 20 and SGSN 30. This can reduce the overhead to support integrity protection for small messages.

In general terms, this may be seen as a method for communication between a mobile terminal operating in a cellular network and a server. The method may comprise: routing communication between the mobile terminal and the server through a Serving GPRS Support Node, SGSN, of the cellular network in which the mobile terminal is operating; and communicating cryptographic integrity check information in data link layer messages between the mobile terminal and the SGSN. In the preferred embodiment, the data link layer messages are Logical Link Control, LLC, layer messages. The cryptographic integrity check information may relate to a bearer or a plurality of bearers.

The encryption may not be of significant further benefit. The method may therefore further comprise deactivating encryption of the communication between mobile terminal and the SGSN. Additionally or alternatively, the method may further comprise deactivating non-cryptographic error detection for the communication between mobile terminal and the SGSN. For either or both cases, the cryptographic integrity check information advantageously replaces information in the data link layer messages for one or both of: encryption; and error detection, such as CRC bits.

It should be noted that the inclusion of bearer integrity protection may assist to prevent hijacking of data sessions and in this case, bearer encryption may not be required. In fact, bearer encryption may create a further overhead and/or an illusion of confidentiality, which may not be realised in practice because the encryption end-points are wrong. For example, there is often thousands of kilometers gap between the SGSN and GGSN.

Preferably, the cryptographic integrity check information uses an Integrity Key (IK) associated with the mobile terminal. Beneficially, the cryptographic integrity check information is based on an algorithm selected from: EPS Integrity Algorithm 1 (EIA1), UMTS Integrity Algorithm 2 (UIA2), EPS Integrity Algorithm 2 (EIA2), UMTS Integrity Algorithm 1 (UIA1), and EPS Integrity Algorithm 3 (EIA3). For instance, the 32 bit Message Authentication Code (MAC), also termed an Integrity Check Value (ICV), provided by EIA1 may be of use, although other algorithms may be used. Since the MAC construction is efficient (it is a Galois MAC), and crypto-operations are already done in this layer, such an approach would be unlikely to carry much overhead, and possibly less overhead overall than implementing encryption algorithms GEA4, EEA1 or EEA2.

In some embodiments, the mobile terminal operates within a VPLMN (that is, it is roaming or attached to a cellular network that is not its home network) and the server is a part of or in communication with a HPLMN of the mobile terminal. In this context, the mobile terminal may be understood as a subscriber and/or a UE. Optionally, the method further comprises: signalling from the Home PLMN of the mobile terminal to the VPLMN to activate the step of communicating cryptographic integrity check information. Signalling options for the home network to tell the visited network to switch off encryption and/or switch on integrity protection may be advantageous. These are not supported by existing signalling messages: neither MAP (see 3GPP TS 29.002); nor S6a (see 3GPP TS 29.272).

Preferably, the server comprises, is a part of or is in communication with a GGSN or a PDN-GW.

In another sense, this concept can be provided by a mobile terminal for operation in a cellular network, configured to communicate cryptographic integrity check information in data link layer messages between the mobile terminal and a Serving GPRS Support Node, SGSN, of the cellular network as part of communication between the mobile terminal and a server. The mobile terminal may have features configured to perform or interact with any of the process steps discussed above.

In a further sense, this concept can be provided by a network entity of a cellular network, such as an SGSN or an entity with similar or corresponding functionality, configured to route communications between a mobile terminal operating in the cellular network and a server and to communicate cryptographic integrity check information in data link layer messages between the mobile terminal and the network entity. The messages may be part of communication between the mobile terminal and the server. Again, the network entity optionally has features configured to perform or interact with any of the process steps discussed above.

Any combination of the individual features discussed above is also provided, even if this combination is not explicitly detailed.

Improved Security in Key Distribution

As part of the configuration procedure between the UE 20 and the SGSN 30, a number of messages are communicated. For example, bearer authentication messages 110 are communicated from the SGSN 30 to the UE 20, which may include a random challenge message (RAND) and an authentication token (AUTN), as is well known in the field of Authentication and Key Agreement (AKA). The UE 20 provides response messages 120, which would typically include an authentication response (SRES) based on the received RAND and AUTN. The SGSN 20 retrieves an authentication vector including RAND and AUTN from the HSS/HLR 60 via Gr interface 160. Typically, the authentication vector comprises a quintuplet having: RAND; AUTN; SRES; a Ciphering Key (CK); and an Integrity Key (IK). The UE 20 conventionally encrypts user plane data using CK and the SGSN 30 can decrypt this data by knowledge of CK.

An alternative approach is now proposed, in which the SGSN 30 is not provided with the true CK used by the UE 20. For example, only the IK may be used by the SGSN 30. In other words, a 3G-quintuplet may be distributed from the HLR/HSS 60 to the SGSN 30, but only the integrity key (IK) may be used by the SGSN 30. The cipher key (CK) field can be set to some null or dummy value, and the true CK will be used elsewhere (or a key derived from CK will be used elsewhere). In another sense, it may be understood that only the integrity key is distributed from HLR/HSS 60 to the SGSN 30 for integrity protection and the cipher key is withheld by the home network.

In general terms, there is provided a method for facilitating authentication on communication between a mobile terminal and a server. The communication is made through a SGSN of a network in which the mobile terminal is operating. A Home PLMN of the mobile terminal generates a ciphering key for encryption of packet-switched data between the mobile terminal and the server. The method comprises: communicating, as part of a message from a network entity in the Home PLMN to the SGSN in which the SGSN expects to receive the ciphering key, alternative data in place of the ciphering key. This may allow the SGSN to continue conventional operation, with information about a ciphering key, without necessarily knowing the ciphering key used by the mobile terminal. Thus, the end point for the encryption may be changed from the SGSN to some other entity, preferably the server (as will be discussed below).

This can alternatively or equivalently be understood as a method for communicating between a Home PLMN of a mobile terminal and a SGSN of a network in which the mobile terminal is operating. The Home PLMN generates a ciphering key for encryption of packet-switched data between the mobile terminal and a server. The method then comprises providing ciphering key data for the mobile terminal (which may a ciphering key, or information by which a ciphering key may be determined) from a network entity in the Home PLMN to the SGSN. However, the ciphering key data is not the ciphering key. In other words, the ciphering key data may be understood as the alternative data noted above. Advantageously, the alternative data or ciphering key data prevents or does not allow the SGSN to determine the ciphering key generated by the Home PLMN in respect of the mobile terminal.

This therefore differs significantly from existing systems, where the HLR/HSS 60 actually provides CK to the SGSN 30. In contrast, the proposed approach results in the SGSN not knowing the correct CK at all. For example, this could be because the alternative data or ciphering key data for the mobile terminal is based on or comprises one or a combination of: (i) a fixed sequence for all mobile terminals; (ii) a sequence having no connection with the ciphering key; and (iii) another parameter associated with the mobile terminal. In respect of (i) or (ii), this may be a dummy value, such as a series of zeroes or some other fixed, random or arbitrary sequence. For (iii), the alternative data or ciphering key data could be set to be identical to IK. In practice, CK and IK may have the same length (for instance 128 bits). The alternative data or ciphering key data may be blank in some cases. As a further alternative, an encrypted version of the CK where the SGSN cannot decode it may be used.

The step of communicating the alternative data for the mobile terminal from the Home PLMN to the SGSN preferably comprises communicating authentication vector information, including the alternative data or ciphering key data. The authentication vector information may be provided in a format as specified by known standards, such as a triplet or a quintuplet. As indicated above, the authentication vector information may include one or more of: RAND; AUTN; SRES; and IK.

The network entity in the Home PLMN preferably comprises one or more of: a HLR; a HSS; an Authentication Centre (AuC); and a proxy server. The possible use or uses of a proxy server will be discussed further below and those details may equally be applicable here. The method preferably further comprises generating the ciphering key in the Home PLMN, for example in the network entity of the HPLMN.

Although the ciphering key is not communicated to the SGSN 30 and therefore not used by it, the ciphering key can be used in practice and one or more ways to employ it will be discussed in the next sections. It should be understood that these approaches can optionally be combined with the techniques described in these sections. A mobile terminal and/or a network entity of a cellular network are equivalently provided, configured to operate in accordance with the method as described above. Moreover, any combination of the individual features discussed above is also provided, even if this combination is not explicitly detailed.

Enhanced User Plane Encryption

It may be advantageous to provide end-to-end encryption between the UE 20 and the server 80. As noted above, the server may comprise or form part of the GGSN 70 in some situations (or a more elaborate server with some GGSN functionality). An Application Server (not shown) in the HPLMN 50 is an alternative form of server that may act as an encryption end-point. As noted above, a PDN-GW (not shown) may be used instead of the GGSN 70. The GGSN 70 can communicate with the server 80 by known Diameter/RADIUS parameters.

To enable the GGSN 70 or server 80 to become the encryption endpoint, an interface is used for the end-point server to interrogate the HSS/HLR 60 for the relevant encryption key (CK or a derivative). This may be done directly (using Diameter, for instance) or through a proxy (such as http→Diameter or Diameter→MAP, or http→MAP), especially if the end-point server is not on the same Local Area Network (LAN) as the HLR/HSS 60.

This end-to-end encryption advantageously uses CK. In order to allow this, the server is required to know CK. This can be achieved by interrogation of the HSS/HLR 60 or a proxy 65 over interface 170. In other words, the GGSN 70 or server 80 should be able to query the HLR/HSS 60 or a proxy 65 in the home network for the relevant cipher key to start end-to-end user plane encryption with the UE 20.

It is foreseen that the GGSN 70 or server 80 (end point server) will use an identifier for the relevant authentication vector, such as an IMSI or RAND or preferably both, to interrogate the HLR/HSS 60. Alternatively, a proxy 65 in front of the HLR/HSS 60 could find the matching CK and return it to the end point server. This will work well if the SGSN 30 in the visited network had also connected through the proxy 65 to retrieve the original vector (minus the CK), which ensures the proxy will know about it.

In general terms, this can be understood as a method for facilitating secure communication between a mobile terminal and a server. The server is part of or in communication with a network entity of a HPLMN of the mobile terminal. The method comprises communicating between the server and a network entity in the Home PLMN in order to transfer information about a (or the) ciphering key generated by the Home PLMN for the mobile terminal to the server. The method may equivalently be understood as communicating (transferring) information about the ciphering key generated by the Home PLMN for the mobile terminal from a network entity in the Home PLMN to the server.

This communicating is advantageously implemented using an Application Programming Interface (API). The network entity in the Home PLMN preferably comprises one or more of: a HLR; a HSS; an Authentication Centre (AuC); and a proxy server. The communicating may be direct, for instance using a Diameter interface. Alternatively, it may be via or through a proxy (server), which is optionally configured to convert the communication between a first protocol used between the network entity and the proxy and a second protocol used between the proxy and the server (for instance converting from HTTP to Diameter, Diameter to MAP, HTTP to MAP). Additionally or alternatively, the proxy may be used if the server 80 is not on the same network (such as Local Area Network, LAN) as the network entity (such as HLR/HSS 60). The proxy preferably sits in front of the HLR/HSS 60 to find the matching CK and return it. Preferably, the SGSN 30 in the VPLMN 10 should also connect through the proxy to retrieve the authentication vector, as discussed in the section above. This may ensure that the proxy will know about it.

The approach described in this section may have similar characteristics to Generic Bootstrapping Architecture (GBA), but may avoid the overheads associated with GBA. A Bootstrapping Service Function (BSF) is not required (although a proxy 65, as discussed above might be considered to have some of the same characteristics). No HTTP interface is required between the device and the BSF, no multi-way exchanges are needed between the device, BSF and a Network Application Function (NAF) server, there is no need to request and consume additional authentication vectors (and increase security at the BSF so it does not lose them) and no need to implement special methods for applications in the device to pass authentication vectors to the USIM of the UE 20.

The server 80 (or proxy 65) may interrogate the HLR/HSS 60 in order to receive the CK. This may be achieved by providing an identifier for the UE 20 and/or relevant authentication vector, such as an IMSI or RAND or preferably both. Additionally or alternatively, an MSISDN or other identifier associated with the mobile terminal (UE and/or subscriber) may be provided. In general terms, this may be understood as the step of communicating comprising communicating from the server to the network entity in the Home PLMN one or more of: an identifier for the mobile terminal; and authentication vector information for the mobile terminal. In GBA for comparison, the client-side application passes a B-TID (which contains the RAND) to the server-side application (NAF) and the NAF passes this to the BSF. The BSF then matches this against the pre-retrieved vector.

It may be possible to avoid caching of the CK by the proxy, by the AuC re-running the key generation algorithm (such as f3) and re-computing CK when needed. Generally speaking, this may be considered generating the ciphering key in the Home PLMN, for example in response to a request from another network entity, such as the server and/or GGSN. The HSS and/or HLR 60 may be developed, for example to support additional MAP or Diameter requests for parts of an Authentication Vector, rather than its whole. To avoid abuse of this new request method (to recover a CK that had already been issued and used), the HLR/HSS 60 may keep a record of the IMSI/RANDs where it has not yet given out CK (for example, because a dummy CK has been issued) and only supply a CK on the first request. If the CK has already been given out, it should not be supplied again. In general terms, this may be considered as the step of generating the ciphering key comprising: maintaining a record identifying for each mobile terminal and/or each authentication event (such as an attachment) with the cellular network whether a ciphering key has been supplied (and/or generated). Then, the record may be checked so that a ciphering key is only supplied (and/or generated) once for each mobile terminal and/or each authentication event with the cellular network.

It will further be recognised that a communications interface between the UE 20 and GGSN 70 (or PDN-GW) may be advantageous. Such an interface already exists in the form of a Protocol Configuration Options (PCO) channel. The GGSN 70 or server 80 may acquire the encryption key by direct exchange of identifiers or other security parameters between the UE 20 and the GGSN 70 or server 80 end point. For example, the PCO Information Element (IE) in Non-Access Stratum (NAS) message exchanges between UE 20 and SGSN 30 already provides a means for conveying information to the GGSN 70 since the PCO IE is transparently conveyed to the GGSN 70 in a bi-directional way.

Beneficially, this may be used to pass the RAND to the GGSN 70 and optionally then pass the combination of IMSI and RAND onto the server 80 (if the server 80 is not combined with the GGSN 70). This would assist in enabling the end-point server 80 to look-up the CK. In general, this may be understood as communicating authentication vector information (such as one or more of: RAND; AUTN; SRES; IK; and CK) for the mobile terminal between the mobile terminal and a GGSN in the Home PLMN using a PCO channel. Preferably, the method may further comprise communicating the authentication vector information for the mobile terminal and an identifier for the mobile terminal from or through the GGSN to the server. This may permit the server to determine ciphering key information for the mobile terminal.

A further aspect, which may be considered alone or in combination with any other idea described herein may be considered as a method for communication between a mobile terminal operating in a cellular network and a network entity of a Home PLMN of the mobile terminal (such as a GGSN). The method comprises communicating between the mobile terminal and the network entity of the Home PLMN using one or both of: end-to end user-plane encryption between the mobile terminal and network entity; and end-to-end cryptographic integrity check information between the mobile terminal and network entity. The end-to-end cryptographic integrity check information may be provided in data link layer messages, as discussed above (for example using the LLC layer). The communication between the mobile terminal and network entity is advantageously routed via a SGSN (that may be of a VPLMN in which the mobile terminal is operating).

In another sense, a mobile terminal and/or a network entity of a cellular network are provided, configured to operate in accordance with any of the methods as described above. Any combination of the individual features discussed above is also provided, even if this combination is not explicitly detailed.

Use of the Ciphering Key at the Mobile Terminal

The encryption key (CK or a derivative; multiple keys are also possible) may be used at the UE 20 and the encryption end-point (GGSN 70, PDN GW or server 80) in different ways. For example, it may be considered that the encryption key may be passed "down" (in terms of layers) into the modem or "up" to the application layer, for example to be used by the application processor. This may avoid the need for 'heavy' application level protocol handshakes to establish the encryption keys at both ends.

If the encryption key is passed "down", then existing crypto-functionality of the modem in the UE 20 may be used with a different end-point (like the Non-Access Stratum versus Access Stratum split in LTE). However, a new frame protocol between UE 20 and GGSN 70 should then be defined. Moreover, the GGSN 70 end-point might still not be in the exact right place, but it is likely to be either the right place or close enough. Then, the application will not have to be concerned with handling encryption.

If the key is passed "up", an API should be defined for the application processor to retrieve the encryption key (or keys) from the wireless modem. However, the application need not use the API, or might impose additional overhead by the manner of usage. It might engage in high-overhead handshakes (like Internet Key Exchange, IKE, Transport Layer Security or Datagram Transport Layer Security) and repeat every time the device wakes up. If it tries to keep security associations alive through sleep cycles, this could also create risk, because existing crypto-software may not be designed to do that (it may negotiate session keys, keeps them unprotected in RAM, and flush them).

Passing the key "up" may be implemented by applying encryption in the networking layer (for instance using IPsec), particularly if the key is used without a further IKE exchange. This may reduce or minimise overhead, and have the advantage that the M2M application may not need to deal significantly with security (for example, if this is a burden). At the networking layer, IPsec may be used for encrypting only the IP payload with Encapsulating Security Payload (ESP). Further optimisations may be achieved by using a combined encryption and authentication method like AES-CCM. This (or similar approaches) may therefore allow the application or networking layer to use an encryption key derived from the cellular security framework (without extra overheads from handshakes or other messages).

In general terms, a method of secure communication via a cellular network between a mobile terminal and a server may be considered. The communication is made through a SGSN of a network in which the mobile terminal is operating. The SGSN and/or the network in which the mobile terminal is operating is separate to the server. The server may be part of or in communication with a network entity of a HPLMN of the mobile terminal. The method comprises applying encryption using a (or the) ciphering key in network layer messages between the mobile terminal and the server. The ciphering key is beneficially based on key information generated by a network entity in a Home PLMN of the mobile terminal. This may be seen as using CK or a key based on CK (for example, the known technique to combine CK and IK into a Ks and then a further key is derived or used to derive a key for ciphering) to encrypt communication between the UE and another end-point that is not the SGSN. Preferably, the ciphering key is generated in association with an authentication vector used to authenticate the mobile terminal to the network in which the mobile terminal is operating (such as the UMTS quintuplet or equivalent). The encryption is advantageously applied in network layer messages between the mobile terminal and the server. The messages between the mobile terminal and the server may comprise Internet Protocol (IP) packets. The step of applying encryption using the ciphering key preferably uses an IPSec protocol.

Optionally, the key may be used for Encapsulating Security Payload (ESP) operation. This may encrypt at least part of the payload of the IP packet (that is, a portion or all of the payload). More generally, this may be considered encrypting the payload of each IP packet using the ciphering key. IP header compression may then still be applied on the link between the whole or part of the link between the UE 20 and SGSN 30 (or GGSN 70, server 80 or an intermediate server). Additionally or alternatively, compression of one or more parameters of the IPSec protocol (such as one or more of: the Security Parameter Index; the Sequence Number; and the Initial Value) may be employed. This may particularly be used when these do not change significantly between packets. This may especially be the case if the Initial Value and Sequence Number are the same. Such a technique may reduce or minimise the overhead per IP packet.

In another enhancement (which may be employed as an alternative to the above), combined encryption and authentication for the IP packets may be used, such as AES-CCM. Optionally, the Integrity Check field (ICV) may be reduced to 4 bytes. In some embodiments, protocol header information within the IP packet may be authenticated but not encrypted. Additionally or alternatively, the unencrypted protocol header information may be compressed in IP packets between the mobile terminal and the server or an intermediate server.

Additionally or alternatively, the method may further comprise not encrypting at least part of respective headers for each IP packets. This may be understood as skipping encryption of some additional headers (like UDP headers, or CoAP headers) which are not especially secret but would be compressible. These may then move from the encrypted data to the additional authenticated data, and would still be covered by the integrity check. The lowest few bits of the SPI may indicate how many bytes into the IP packet will count as AAD and will not be part of the encrypted block therefore. Any combination of the individual features discussed above is also provided, even if this combination is not explicitly detailed.

Use of an AKA Push Message

A channel between the UE 20 and the GGSN 70 (or equivalent, such as PDN-GW) could be used to carry a GBA Push message (GPI) from the GGSN 70 to the UE 20. One possible realisation of the channel is to use the existing PCO Information Element (IE) in Non-Access Stratum (NAS) message exchanges between UE and SGSN, which is transparently forwarded to the GGSN. The PCO IE can be conveyed from UE to the GGSN and vice-versa, thereby providing a bi-directional channel. This approach may consume an additional authentication vector (and the CK from the first vector would then be wasted).

In general terms, this may be considered a method for communicating between a mobile terminal and a GGSN in a HPLMN of the mobile terminal. The method comprises communicating an authentication and key agreement push message from the GGSN to the mobile terminal. Preferably, the step of communicating is via a control plane channel and/or the authentication and key agreement push message is generated at the GGSN. Advantageously, the step of communicating is via a channel which may be realised using the PCO IE in message exchanges between UE and SGSN that is transparently forwarded to/from GGSN. In the preferred embodiment, the authentication and key agreement push message is a Generic Bootstrapping Architecture (GBA) Push message.

A mobile terminal and/or a network entity of a cellular network are equivalently provided, configured to operate in accordance with the method as described above. This approach may be implemented alone, but it may be preferably combined with the use of the ciphering key at the mobile terminal as discussed in the previous section. Moreover, it will be understood that any of the approaches discussed in any of the sections above can be combined with one another as appropriate.

The invention claimed is:

1. A method for establishing an encryption endpoint for encrypted packet-switched data that is being transmitted between a mobile terminal and a server, the method comprising:
    determining that the encrypted packet-switched data is passing through a Serving GPRS Support Node (SGSN) or an equivalent cellular network entity in which the mobile terminal is operating, the encrypted packet-switched data passing through the SGSN or the equivalent cellular network entity prior to reaching the server;
    causing a Home Public Land Mobile Network (PLMN) of the mobile terminal to generate a ciphering key that is usable to decrypt the encrypted packet-switched data that is passing between the mobile terminal and the server, wherein the server is not the SGSN or the equivalent cellular network entity;
    communicating, as part of a message from a network entity in the Home PLMN to the SGSN or the equivalent cellular network entity in which the SGSN or the equivalent cellular network entity expects to receive the ciphering key, alternative data in place of the ciphering key, wherein the alternative data is one of a dummy ciphering key or an alternative ciphering key that is unusable by the SGSN or the equivalent cellular network entity to decrypt encrypted packet-switched data that is received and that is unable to derive the ciphering key; and
    at the server, using the ciphering key to decrypt the encrypted packet-switched data, whereby the Home PLMN is the encryption endpoint as opposed to the SGSN or the equivalent cellular network entity.

2. The method of claim 1, wherein the alternative data is based on one or a combination of: a fixed sequence for all mobile terminals; a sequence having no connection with the ciphering key; and another parameter associated with the mobile terminal.

3. The method of claim 1, wherein the step of communicating the alternative data for the mobile terminal from the Home PLMN to the SGSN or the equivalent cellular network entity comprises communicating authentication vector information, including the alternative data.

4. The method of claim 1, the method further comprising: receiving the encrypted packet-switched data at the Home PLMN, wherein the encrypted packet-switched data passed through the SGSN or the equivalent cellular network entity still in an encrypted format.

5. A method of secure communication via a cellular network between a mobile terminal and a server, the communication being made through a Serving GPRS Support Node (SGSN) or an equivalent cellular network entity of a network in which the mobile terminal is operating that is separate to the server, the method comprising:
applying encryption using a ciphering key generated by a network entity in a Home Public Land Mobile Network (PLMN) of the mobile terminal to messages that are passed between the mobile terminal and the server that is not the SGSN or the equivalent cellular network entity;
providing the ciphering key to the server while refraining from providing the ciphering key to the SGSN or the equivalent cellular network entity, wherein, instead of providing the ciphering key to the SGSN or the equivalent cellular network entity, alternative data is provided to the SGSN or the equivalent cellular network entity so that the SGSN or the equivalent cellular network entity continues to operate even though the SGSN or the equivalent cellular network entity does not receive the ciphering key, wherein the alternative data is one of a dummy ciphering key or an alternative ciphering key that is unusable by the SGSN or the equivalent cellular network entity to decrypt encrypted packet-switched data that is received and that is unable to derive the ciphering key; and
at the server, using the ciphering key to decrypt the messages, whereby the Home PLMN is the encryption endpoint as opposed to the SGSN or the equivalent cellular network entity, the Home PLMN being the encryption endpoint as a result of the SGSN or the equivalent cellular network entity receiving the alternative data as opposed to the ciphering key.

6. The method of claim 5, wherein the ciphering key is generated in association with an authentication vector used to authenticate the mobile terminal to the network in which the mobile terminal is operating.

7. The method of claim 5, wherein the step of applying encryption comprises applying encryption using the ciphering key in network layer messages between the mobile terminal and the server.

8. The method of claim 5 wherein the messages between the mobile terminal and the server comprise IP packets, the method further comprising:
encrypting at least part of the payload of each IP packet using the ciphering key.

9. The method of claim 5, wherein the messages between the mobile terminal and the server comprise IP packets, the method further comprising:
using IP header compression on the IP packets between the mobile terminal and the server or an intermediate server.

10. The method of claim 5, wherein the messages between the mobile terminal and the server comprise IP packets, the method further comprising:
implementing combined encryption and authentication for the IP packets.

11. The method of claim 5, further comprising:
transferring, between a network entity in the Home PLMN and the server, information about the ciphering key generated by the Home PLMN for the mobile terminal.

12. The method of claim 11, wherein the step of transferring uses an Application Programming Interface.

13. The method of claim 11, wherein the step of transferring comprises communicating from the server to the network entity in the Home PLMN one or more of: an identifier for the mobile terminal; and authentication vector information for the mobile terminal.

14. The method of claim 5, further comprising:
communicating authentication vector information for the mobile terminal between the mobile terminal and a Gateway GPRS Support Node, GGSN, in the Home PLMN using a Protocol Configuration Options, PCO, channel.

15. The method of claim 14, further comprising:
communicating the authentication vector information for the mobile terminal and an identifier for the mobile terminal from the GGSN to the server.

16. The method of claim 5, wherein the network entity in the Home PLMN comprises one or more of: a Home Location Register (HLR), a Home Subscriber Server (HSS), an Authentication Centre (AuC), and a proxy server.

17. The method of claim 5, further comprising:
generating the ciphering key in the network entity of the Home PLMN.

18. The method of claim 17, wherein the step of generating the ciphering key comprises:
maintaining a record identifying for each mobile terminal and/or each authentication event with the cellular network whether a ciphering key has been supplied; and
checking the record so that a ciphering key is only supplied once for each mobile terminal and/or each authentication event with the cellular network.

19. A telecommunications system comprising a home public land mobile network (HPLMN) of a mobile device, the telecommunications system being configured to perform a method for establishing an encryption endpoint for communications passing between the mobile device and the HPLMN, the method comprising:
identifying that a serving general packet radio service support node (SGSN) or an equivalent cellular network entity is situated between the HPLMN and the mobile device, the SGSN or the equivalent cellular network entity including functionality to act as the encryption endpoint for communications passing therethrough;
causing the HPLMN to send an alternative ciphering key to the SGSN or the equivalent cellular network entity, the alternative ciphering key being unusable by the SGSN or the equivalent cellular network entity to decrypt encrypted packet-switched data that is received at the SGSN or the equivalent cellular network entity and being unable to derive the ciphering key and that is sent from the mobile device;
identifying that the mobile device is sending a first encrypted packet-switched data to the SGSN or the equivalent cellular network entity;
at a server that is a part of the HPLMN, receiving the first encrypted packet-switched data from the SGSN or the equivalent cellular network entity, the first encrypted packet-switched data still being in an encrypted format even after passing through the SGSN or the equivalent cellular network entity;

causing the server to interrogate a network entity to acquire an actual ciphering key that is usable to decrypt the first encrypted packet-switched data, the network entity being different than the server, the network entity also being located within the HPLMN; and at the server, using the actual ciphering key to decrypt the first encrypted packet-switched data, whereby the HPLMN is the encryption endpoint as opposed to the SGSN or the equivalent cellular network entity.

20. The telecommunications system of claim 19, wherein the network entity is a home location register or a home subscriber server (HLR/HSS), wherein the home public land mobile network (HPLMN) further includes a proxy server, and wherein the proxy server is configured to:

intercept at least some communications between the serving general packet radio service support node (SGSN) and the HLR/HSS; and intercept at least some communications between the server and the HLR/HSS.

* * * * *